(12) United States Patent
Skov et al.

(10) Patent No.: US 10,439,702 B2
(45) Date of Patent: Oct. 8, 2019

(54) CONTROL OF TRANSMISSION MODE SELECTION

(71) Applicant: Nokia Solutions and Networks Oy, Espoo (FI)

(72) Inventors: Peter Skov, Beijing (CN); Chun Ye Wang, Beijing (CN); Jing Xiu Liu, Beijing (CN); Jian Kang Wang, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/532,199

(22) PCT Filed: Dec. 3, 2014

(86) PCT No.: PCT/CN2014/092889
§ 371 (c)(1),
(2) Date: Jun. 1, 2017

(87) PCT Pub. No.: WO2016/086365
PCT Pub. Date: Jun. 9, 2016

(65) Prior Publication Data
US 2017/0338880 A1 Nov. 23, 2017

(51) Int. Cl.
*H04B 7/06* (2006.01)
*H04B 17/336* (2015.01)
*H04B 7/0413* (2017.01)

(52) U.S. Cl.
CPC ......... *H04B 7/0689* (2013.01); *H04B 7/0617* (2013.01); *H04B 17/336* (2015.01); *H04B 7/0413* (2013.01)

(58) Field of Classification Search
CPC .. H04B 7/0689; H04B 7/0617; H04B 17/336; H04B 7/0413
See application file for complete search history.

(56) References Cited

U.S. PATENT DOCUMENTS 5,826,196 A * 10/1998 Cuthrell ............... H04M 1/725
455/462
9,088,944 B2 * 7/2015 Byun ..................... H04B 7/024
(Continued)

FOREIGN PATENT DOCUMENTS

CN 1862997 A 11/2006
CN 102858012 A 1/2013
(Continued)

OTHER PUBLICATIONS

Van Veen, Barry D., et al., "Beamforming: A Versatile Approach to Spatial Filtering", IEEE ASSP Magazine, Apr. 1988, pp. 4-24.

*Primary Examiner* — Jean B Corrielus
(74) *Attorney, Agent, or Firm* — Harrington & Smith (57) ABSTRACT

An apparatus including at least one processing circuitry, and at least one memory for storing instructions to be executed by the processing circuitry, wherein the at least one memory and the instructions are configured to, with the at least one processing circuitry, cause the apparatus at least: to obtain, over a series of times, information related to at least one of spatial properties and frequency properties of a channel used in a directional communication between a communication network control element or function and a communication element, to quantify the information related to at least one of spatial properties and frequency properties into a metric, to track whether the metric is smaller than a first threshold or greater than a second threshold during a predetermined period of time, and to decide to use a first transmission mode or a second transmission mode on the basis of a result of the tracking.

22 Claims, 4 Drawing Sheets

(56) References Cited

U.S. PATENT DOCUMENTS

| | | | | |
|---|---|---|---|---|
| 2002/0025807 | A1* | 2/2002 | Zimmerman | H04B 17/309 |
| | | | | 455/423 |
| 2005/0276418 | A1* | 12/2005 | Hagiwara | H04L 9/32 |
| | | | | 380/270 |
| 2008/0188192 | A1* | 8/2008 | Chae | H04B 7/063 |
| | | | | 455/129 |
| 2011/0059765 | A1* | 3/2011 | Kim | H04B 7/024 |
| | | | | 455/550.1 |
| 2011/0243100 | A1* | 10/2011 | Ball | H04B 7/0689 |
| | | | | 370/335 |
| 2012/0077511 | A1* | 3/2012 | Shin | H04B 7/022 |
| | | | | 455/452.1 |
| 2012/0078640 | A1 | 3/2012 | Shirakawa et al. | 704/500 |
| 2012/0281781 | A1* | 11/2012 | Xiao | H04B 7/024 |
| | | | | 375/267 |
| 2014/0119223 | A1* | 5/2014 | Song | H04W 72/085 |
| | | | | 370/252 |
| 2014/0274164 | A1* | 9/2014 | Hatakeyama | H04W 4/026 |
| | | | | 455/456.6 |
| 2016/0134015 | A1* | 5/2016 | Sonoda | H01Q 1/1257 |
| | | | | 342/368 |
| 2017/0135085 | A1* | 5/2017 | Kaushik | H04W 72/046 |

FOREIGN PATENT DOCUMENTS

| | | | | |
|---|---|---|---|---|
| EP | 2670060 A2 | 12/2013 | | |
| JP | 2011029894 A | 2/2011 | | |
| WO | WO 2010081388 A1 | 7/2010 | | |
| WO | WO 2013003973 A1 * | 1/2013 | | H04W 72/085 |
| WO | WO 2014179916 A1 | 11/2014 | | |

* cited by examiner

CONTROL OF TRANSMISSION MODE SELECTION

BACKGROUND

Field

The present invention relates to apparatuses, methods, systems, computer programs, computer program products and computer-readable media usable for controlling a transmission mode selection in a communication network.

Background Art

The following description of background art may include insights, discoveries, understandings or disclosures, or associations, together with disclosures not known to the relevant prior art, to at least some examples of embodiments of the present invention but provided by the invention. Some of such contributions of the invention may be specifically pointed out below, whereas other of such contributions of the invention will be apparent from the related context.

The following meanings for the abbreviations used in this specification apply:
3GPP $3^{rd}$ Generation Partnership Project
BF: beamforming
BS: base station
CDD: cyclic delay diversity
CPU: central processing unit
CQI: channel quality indicator
DL: downlink
DoA: direction of arrival
eNB: evolved node B
LTE: Long Term Evolution
LTE-A: LTE Advanced
MIMO: multiple-input-multiple-output
O&M: operation and maintenance
PMI: precoding matrix indicator
RRC: radio resource control
SINR: signal-to-interference-and-noise ratio
SRS: sounding reference signal
TD: time division
TM: transmission mode
UE: user equipment
UL: uplink
VNF: virtual network function Embodiments of the present invention are related to a communication system in which a procedure can be implemented for switching between different communication modes, i.e. transmission modes, for a communication between the network and a communication element, such as a UE.

SUMMARY

According to an example of an embodiment, there is provided, for example, an apparatus comprising at least one processing circuitry, and at least one memory for storing instructions to be executed by the processing circuitry, wherein the at least one memory and the instructions are configured to, with the at least one processing circuitry, cause the apparatus at least: to obtain, over a series of times, information related to at least one of spatial properties and frequency properties of a channel used in a directional communication between a communication network control element or function and a communication element, to quantify the information related to at least one of spatial properties and frequency properties into a metric, to track whether the metric is smaller than a first threshold or greater than a second threshold during a predetermined period of time, and to decide to use a first transmission mode or a second transmission mode on the basis of a result of the tracking.

Furthermore, according to an example of an embodiment, there is provided, for example, a method comprising obtaining, over a series of times, information related to at least one of spatial properties and frequency properties of a channel used in a directional communication between a communication network control element or function and a communication element, quantifying the information related to at least one of spatial properties and frequency properties into a metric, tracking whether the metric is smaller than a first threshold or greater than a second threshold during a predetermined period of time, and deciding to use a first transmission mode or a second transmission mode on the basis of a result of the tracking.

According to further refinements, these examples may include one or more of the following features:
  when tracking is conducted as to whether the metric is smaller than the first threshold or greater than the second threshold during the predetermined period of time, a rate of change in time of the metric may be monitored, and, when deciding to use the first transmission mode or the second transmission mode on the basis of a result of the tracking, either the first transmission mode or the second transmission mode may be selected on the basis of the monitoring of the rate of change in time of the metric;
  as the information related to at least one of spatial properties and frequency properties, beamforming vectors of the directional communication may be obtained, and the beamforming vectors may be quantified into a metric by calculating correlation parameters over the series of times, wherein each correlation parameter may indicate a correlation between successive beamforming vectors;
  as the information related to at least one of spatial properties and frequency properties, frequency shift of the directional communication may be obtained, and the frequency shift may be quantified into a metric by calculating Doppler spread parameters over the series of times;
  in case the tracking results in that the metric is smaller than a first threshold, it may be decided to keep the first transmission mode or to switch from the second transmission mode to the first transmission mode, and in case the tracking results in that the metric is greater than a second threshold, it may be decided to keep the second transmission mode or to switch from the first second transmission mode to the second transmission mode;
  the first threshold may be equal to the second threshold, or the first threshold may be greater than the second threshold;
  the first transmission mode may be a transmission mode comprising a multiple-input-multiple-output communication using a sector beam for communication, and the second transmission mode may be a transmission mode comprising a user specific beamforming;
  the first transmission mode may comprise a transmission mode 3 of a Long-Term-Evolution or Long-Term-Evolution-Advanced communication network, and the second transmission mode may comprise at least one of a transmission mode 7, transmission mode 8 and transmission mode 9 of a Long-Term-Evolution or Long-Term-Evolution-Advanced communication network;

a signal-to-interference-and-noise ratio on the channel used in the directional communication between the communication network control element or function and the communication element may be measured, and, when deciding to use the first transmission mode or the second transmission mode, the measured signal-to-interference-and-noise ratio may be considered;

a forgetting filter may be applied to the metric for controlling a number of metric updates to be considered in the tracking and deciding;

it may be determined whether a handover processing is conducted for the communication element of the directional communication, and the deciding to use the first transmission mode or the second transmission mode may be suspended in case a handover processing is conducted;

the above processing may be implemented in a communication network control element configured to control the directional communication to the communication element, wherein the communication element may include at least one of a terminal device or user equipment.

In addition, according to embodiments, there is provided, for example, a computer program product for a computer, including software code portions for performing the steps of the above defined methods, when said product is run on the computer. The computer program product may include a computer-readable medium on which said software code portions are stored. Furthermore, the computer program product may be directly loadable into the internal memory of the computer and/or transmittable via a network by means of at least one of upload, download and push procedures.

BRIEF DESCRIPTION OF THE DRAWINGS

Some embodiments of the present invention are described below, by way of example only, with reference to the accompanying drawings, in which.

DESCRIPTION OF EMBODIMENTS

In the last years, an increasing extension of communication networks, e.g. of wire based communication networks, such as the Integrated Services Digital Network (ISDN), DSL, or wireless communication networks, such as the cdma2000 (code division multiple access) system, cellular 3rd generation (3G) like the Universal Mobile Telecommunications System (UMTS), fourth generation (4G) communication networks or enhanced communication networks based e.g. on LTE or LTE-A, fifth generation (5G) communication networks, cellular 2nd generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards or specifications for telecommunication network and access environments.

Embodiments as well as principles described below are applicable in connection with any communication element or terminal device, network element, relay node, server, node, corresponding component, and/or to any communication system or any combination of different communication systems that support required functionalities. The communication system may be a fixed communication system, a wireless communication system or a communication system utilizing both fixed networks and wireless networks. The protocols used, the specifications of communication systems, apparatuses, such as nodes, servers and user terminals, especially in wireless communication, develop rapidly. Such development may require extra changes to an embodiment. Therefore, all words and expressions should be interpreted broadly and they are intended to illustrate, not to restrict, embodiments.

In the following, different exemplifying embodiments will be described using, as an example of an access architecture to which the embodiments may be applied, a radio access architecture based on 3GPP standards, such as a third generation or fourth generation (like LTE or LTE-A) communication network, without restricting the embodiments to such an architecture, however. It is obvious for a person skilled in the art that the embodiments may also be applied to other kinds of communications networks having suitable means by adjusting parameters and procedures appropriately, e.g. WLAN or WiFi, worldwide interoperability for microwave access (WiMAX), Bluetooth®, personal communications services (PCS), ZigBee®, wideband code division multiple access (WCDMA), systems using ultra-wideband (UWB) technology, sensor networks, and mobile ad-hoc networks (MANETs).

The following examples and embodiments are to be understood only as illustrative examples. Although the specification may refer to "an", "one", or "some" example(s) or embodiment(s) in several locations, this does not necessarily mean that each such reference is related to the same example(s) or embodiment(s), or that the feature only applies to a single example or embodiment. Single features of different embodiments may also be combined to provide other embodiments. Furthermore, terms like "comprising" and "including" should be understood as not limiting the described embodiments to consist of only those features that have been mentioned; such examples and embodiments may also contain features, structures, units, modules etc. that have not been specifically mentioned.

A basic system architecture of a communication system where some examples of embodiments are applicable may include an architecture of one or more communication networks including a wired or wireless access network subsystem and a core network. Such an architecture may include one or more communication network control elements, access network elements, radio access network elements, access service network gateways or base transceiver stations, such as a base station (BS), an access point or an eNB, which control a respective coverage area or cell(s) and with which one or more communication elements, user devices or terminal devices, such as a UE, or another device having a similar function, such as a modem chipset, a chip, a module etc., which can also be part of an element, function or application capable of conducting a communication, such as a UE, an element or function usable in a machine to machine or D2D communication architecture, or attached as a separate element to such an element, function or application capable of conducting a communication, or the like, are capable to communicate via one or more channels for transmitting several types of data. Furthermore, core network elements such as gateway network elements, policy and charging control network elements, mobility management entities, operation and maintenance elements, and the like may be included.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from an element, function or application, like a communication element, such as a UE, a communication network control element, such as an eNB, a gateway node or another core network element, and other elements of the same or other communication networks besides those described in detail herein below.

A communication network may also be able to communicate with other networks, such as a public switched telephone network or the Internet. The communication network may also be able to support the usage of cloud services. It should be appreciated that network elements of an access system, of a core network etc., and/or respective functionalities may be implemented by using any node, host, server, access node or entity etc. being suitable for such a usage.

Furthermore, the described network elements, such as communication elements, like a UE, communication network control elements, access network elements etc., like an eNB, etc., as well as corresponding functions as described herein, and other elements, functions or applications may be implemented by software, e.g. by a computer program product for a computer, and/or by hardware. For executing their respective functions, correspondingly used devices, nodes or network elements may include several means, modules, units, components, etc. (not shown) which are required for control, processing and/or communication/signaling functionality. Such means, modules, units and components may include, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means including e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

It should be appreciated that according to some examples, a so-called "liquid" or flexible network concept may be employed where the operations and functionalities of a communication network control element, network function, or of another entity of the communication network, may be performed in different entities or functions, such as in a node, host or server, in a flexible manner. In other words, a "division of labor" between involved network elements, functions or entities may vary case by case.

Recent communications network developments are to use MIMO technology so as to achieve higher data rates and to improve the robustness of data transmission. A MIMO system may consist, for example, of m transmit antennas and n receive antennas. As a special technique, beamforming is employed which also permits targeted illumination of specific areas, making it possible to improve transmission to users at the far reaches of cell coverage.

Beamforming uses multiple antennas to control the direction of a wavefront by appropriately weighting the magnitude and phase of individual antenna signals (transmit beamforming). For example this makes it possible to provide better coverage to specific areas along the edges of cells. Because beamforming is intended to provide the best signal possible to a UE at a specific location, finding a vector, also referred to as the weight vector w, is essential. For finding the weight vector, different approaches are possible. For example, a determination by using DoA is conceivable, where specialized algorithms, are used in the BS to determine the DoA for a UE signal, and thus to determine its location. Another approach is a determination of the weighting by using channel estimation. Here, for example, suitable uplink signal or training sequences are used by the BS for estimating the channel; for example, an UL sounding reference signal (SRS) is used.

Beamforming is in particular employed in the time division duplex (TDD) modes, for example in TD-LTE based networks. For example, in Release 9 systems, up to four antennas are defined in the BS (eNB) and up to four antennas in the UE. In Release 10 systems, up to eight antennas are used in the downlink.

Depending on current situations, different communication modes for transmitting data can be employed. In communication networks such as LTE or LTE-A networks, various transmission modes (TM) are defined. For example, a so-called TM 3 provides an open loop spatial multiplexing with CDD, in which spatial multiplexing of two to four layers that are multiplexed to two to four antennas, respectively, is supported in order to achieve higher data rates. TM 3 is used, for example, when channel information is missing or when the channel rapidly changes. A so-called TM 7 provides beamforming and uses UE-specific reference signals. Both the data and the RS are transmitted using the same antenna weightings. A so called TM 8 provides dual layer beamforming This mode permits the BS to weight two layers individually at the antennas so that beamforming can be combined with spatial multiplexing for one or more UEs. A so-called TM 9 provides a transmission by up to 8 layers. In this mode, up to eight layers can be used, so up to eight physical transmit antennas are needed, leading to up to 8×8 MIMO configurations. Furthermore, both single user and multi user MIMO is possible, and dynamic switching between both modes is possible without special signaling by higher layers.

For example, one or more of TM 7, TM 8 and TM 9 are used in communication network implementations, wherein UE-specific beams used for the downlink transmission are generated on the fly by the eNB from estimates of the radio channel done in the uplink. For UEs that are not (yet) connected or not capable of using TM7/8/9, a so-called "sector beam" is used. The sector beam is also denoting the cell area as defined by the network planning.

Figure 1:
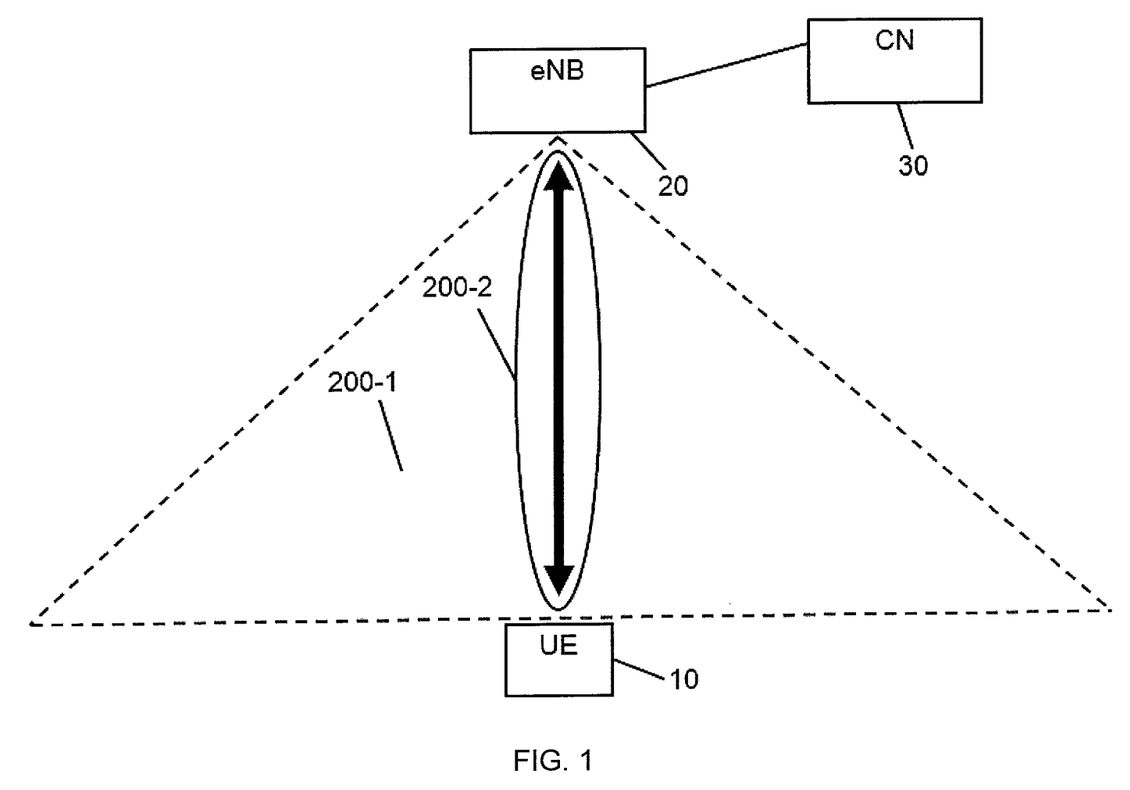
FIG. 1 shows a diagram illustrating a general architecture of a communication system where some examples of embodiments are implementable.

With regard to FIG. 1, a diagram illustrating a general architecture of a communication system is shown where some examples of embodiments are implementable. It is to be noted that the structure indicated in FIG. 1 shows only those devices, network elements and links which are useful for understanding principles underlying some examples of embodiments of the invention. As also known by those skilled in the art there may be several other network elements or devices involved in a communication in the communication system which are omitted here for the sake of simplicity.

In FIG. 1, a communication network is shown which forms a general basis of the example of a communication system according to some examples of embodiments. Specifically, as the network, a (wireless) communication network based for example on a 3GPP specification is provided. It is to be noted that both the number of network elements as well as the type thereof as depicted in FIG. 1 are merely intended to provide a basis for illustrating the principles of the control processing according to some examples of embodiments, while each one of the number and type of the involved network elements may be different to those shown in FIG. 1.

According to FIG. 1, reference sign 10 denotes a communication element, such as a UE, e.g. of a subscriber which represents one terminal point of a communication, i.e. from which UL data packets are transmitted and to which DL data packets are sent.

Reference sign 20 denotes an access network element or communication network control element via which the UE 10 is connected to the communication network. The communication network control element comprises, for example, a base station, access nodes or the like, such as an eNB.

Reference sign 30 denotes a core network of the communication network to which the communication network control element such as the eNB 20 is connected.

As indicated above, it is assumed that the communication network control element 20 and the communication element are capable to conduct a directional communication with each other (indicated by an arrow in FIG. 1), wherein, for example, depending on a selected transmission mode, a communication based on a sector beam (see reference sign 200-1) or a communication based on beamforming (see reference sign 200-2) is established.

It is to be noted that even though FIG. 1 shows only one UE 10 and one eNB 20, it is obvious that also other configurations are feasible. For example, more than one UE can be connected to one eNB, while one UE 10 may be connected to more than one communication network control element, for example.

When using a transmission mode implementing user-specific beamforming, it is necessary that the communication network control element, such as the eNB 20, is able to spatial properties of the radio channel towards the concerned UE 10. However, under certain circumstances, e.g. due to user mobility, radio environment, etc., the eNB tracking capability may be reduced. This may lead to a situation where a user-specific beamforming is not the optimal transmission mode.

That is, under certain circumstance, the benefit of applying user-specific beamforming may be limited or even negative when compared to the baseline of using a transmission mode such as TM3 over sector beam. For example, this may occur in view of fast changing DoA due to a fast moving UE, or in view of a lack of a dominant DoA and fast changing spatial properties, which is typical, for example, in dense urban areas.

Another point is, for example, that a demodulation performance for beamforming transmission modes, such as TM 8 and TM 9, may be impacted by high Doppler spread in non-line of sight radio channels.

According to some examples of embodiments of the invention, a control procedure and corresponding network configuration will be described in the following which provide a control for switching between communication modes (i.e. transmission modes), which improves, for example, a selection of the correct transmission mode, i.e. controls when to use e.g. a beamforming transmission mode for DL transmission, or another transmission mode.

Basically according to some examples of embodiments, spatial properties and/or frequency properties of a radio channel in a directional communication are considered for deciding as to which transmission mode is to be used (i.e. kept or switched to). Thus, a control procedure can be generated allowing to optimize the switching between transmission modes, such as between transmission modes using BF or MIMO. For this purpose, according to some examples of embodiments, the behaviour of specific metrics, which reflect spatial or frequency properties of the channel, is tracked, for example by using an autocorrelation of a time series of beamforming vectors or frequency shifts. By using one or more thresholds, the requirement to switch between transmission modes is then decided.

Referring to a scenario as depicted e.g. in FIG. 1, it is assumed that UE 10 and eNB 20 have established a directional communication connection, wherein the UE 10 is configured to be capable for beamforming. When beamforming is activated for the UE 10, a time series of beamforming vectors $\{w\_n\}$ (n being an integer greater than 2) will be generated in the eNB 20 or fed-back by the UE 10, for example when communicating in TM 9.

It is to be noted that there exists a plurality of possible ways of quantifying spatial properties and the time variance of these properties. The general idea is to quantify the instantaneous spatial properties of the radio channel with a metric, and based on the rate of change of this metric, a selection between different transmission modes, e,g, one using beamforming and another one offering MIMO, is done. In other words, according to some examples of embodiments, it is tracked or determined whether the metric is smaller or greater than specified threshold during a predetermined period of time, for example, i.e. the rate of change in time of the metric is monitored. Then, a suitable transmission mode is selected on the basis of the monitoring of the rate of change in time of the metric.

In the present example of embodiments, it is assumed that beamforming is providing benefit in cases where a correlation between $w\_n$ and $w\_n+1$ is close to one. Similarly, it can be assumed that beamforming is providing benefit in cases where a correlation between $w\_n$ and $s\_n$ is close to one, wherein $s\_n$ represents a unitary beamforming vector.

If over a predetermined period of time (i.e. a predetermined number of successively generated or obtained beamforming vectors) the correlation between successive beamforming vectors is low then this is an indication that the spatial properties of the radio channel are changing too fast to be tracked by the eNB 20. In such a case, it may be better to switch to another transmission mode, e.g. from TM 9 to TM 3.

The decision to make such a switch may be based on several factors, as described below, e.g. on a number of events where the correlation is low, other factors like quality states, etc.

That is, according to some examples of embodiments, it is possible to consider an interworking with another approach for deciding a transmission mode switching, e.g. a switching between beamforming TM, like TM 9, and TM3. For example, a combination with a control is conceivable where a transmission mode selection depends on an estimated DL SINR. Here, control of switching between different transmission modes is based, for example, on a measurement of connection quality parameters. For example, in case a CQI is above a certain threshold, switching from a beamforming transmission mode to another transmission mode, such as TM3, is executed. That is, transmission mode switching can be based in addition to spatial (frequency) properties, for example, on adapting to signal quality. Thus, it is possible, for example, that users with a high signal quality (SINR) get optimal throughput with a specific transmission mode, such as TM 3.

In the following, some examples of embodiments for implementing the above discussed control procedure are described.

As indicated above, there exist several options to calculate a suitable metric, e.g. a correlation parameter, to be used for tracking the behavior of e.g. spatial properties of the channel.

As one option, when assuming that the most recent beamforming vector is given, a weight vector Wn has a form as in equation (1).

$$\vec{W}_n = [w_n(1), w_n(2), w_n(3), w_n(4)] \quad (1)$$

As a first option for determining a metric as defined above, an autocorrelation according to equation (2) is applicable.

$$\rho_n = W_n \cdot W_{n-1} \quad (2)$$

The metric or correlation parameter ρn is then tracked over a predetermined period of time, and in case the thus calculated metric is below a first threshold, then a switching from e.g. a beamforming TM, like TM 9, to TM 3 is selected.

As another option for determining a metric as defined above, an autocorrelation of a unitary beamforming vector according to equation (3) is applicable.

$$\rho_n = \vec{W}_n \cdot \vec{S}_n \quad (3)$$

wherein $$\vec{S}_n = [s_n(1), s_n(2), s_n(3), s_n(4)] \quad (4)$$

and $$s_n(m) = e^{j2\pi d_m \sin(\alpha_n)} \quad (5)$$

In equation (5), $d_m$ is the m-th antenna element distance from a reference element relative to a wave length under consideration. For example, an array is designed so that antennas are separated with half wave length:

$$d_m = \frac{m-1}{2} \quad (6)$$

where m=1, 2, 3, . . . , number of antenna elements.

The incident wave angle $\alpha_n$ is given, for example, by equation (7).

$$\alpha_n = A\left(\sum_{m=1}^{3} w_n(m+1)w_n(m)^*\right) \quad (7)$$

where A( ) is a function which returns a phase angle of a complex value and $w_n$(m) is the m-th antenna weight for a beamforming vector w_n.

According to some further examples of embodiments, the switching control is adapted according to properties of the network control. For example, switching to a transmission mode using MIMO, such as TM 3, may require a certain amount of time and involves also additional load to the network, e.g. due to RRC signaling. Hence, it is to be ensured that the correlation is reduced for a number of beamforming vector updates before switching. For this purpose, for example, a so-called forgetting filter is applied. A forgetting filter specifies, by means of a forgetting factor β, how quickly the filter forgets past sample information. In some example embodiments of the invention, values of forgetting factor β are between 0.9 and 0.001. In some example embodiments of the invention, specific value example for the forgetting factor β is 0.01.

A corresponding example for applying such a forgetting filter to a correlation parameter $\rho_n$ is indicated in equation (8).

$$\rho'_n = \beta \rho_n + (1-\beta)\rho'_{n-1} \quad (8)$$

where $\rho'_n$ is the filtered correlation parameter.

According to some further examples of embodiments, the correlation parameter, such as $\rho'_n$, is compare with specified thresholds, i.e. state transition specific threshold, which are used to trigger a switching (or maintenance) of a transmission mode. For example, the state transition specific thresholds are set in such a manner that the risk for ping pong switching is minimized. Example values for corresponding threshold value e.g. for switching from beamforming to MIMO TM may be 0.95, while a corresponding threshold for switching from MIMO to beamforming may be 0.99. Alternatively, only one threshold may be set for both switching directions.

According to some further examples of embodiments, it is also considered whether a UE in question is currently in a handover processing or the like. That is, according to some examples of embodiments, if a handover event is detected by the eNB 20, then switching between transmission modes such as MIMO and beamforming is disabled or suspended during handover. By means of this, an improper switching decision is avoided.

According to some examples of embodiments, the control procedure is continued irrespective of the actual transmission mode being set, i.e. even after switching from e.g. a beamforming mode like TM 9 to another mode like TM 3. That is, after switching to MIMO, a calculation of metrics being based on spatial properties of the channel, i.e. beamforming vectors, is continued. By means of this, switching back to beamforming mode is supported.

While in the above some examples of embodiments spatial properties of the channel are considered, it is also possible, as indicated above, to consider in addition or alternatively frequency related properties in the decision as to which transmission mode is to be used.

For example, it is assumed that in the scenario in FIG. 1 a movement of the UE 10 leads to a high Doppler spread in the communication.

Doppler spread of the channel relates to the coherence time of the channel. When the UE 10 is moving relatively to the eNB 20, the UE's velocity causes a shift in the frequency of the signal transmitted along each signal path (also referred to as Doppler shift). Signals traveling along different paths can have different Doppler shifts, corresponding to different rates of change in phase. The difference in Doppler shifts between different signal components contributing to a single fading channel tap is called Doppler spread. Channels with a large Doppler spread have signal components that are each changing independently in phase over time.

According to some examples of embodiments, a metric related to the Doppler spread is calculated or estimated, for example on the basis of sounding reference signal (SRS). When the metric based on the Doppler spread exceeds, for example, a predefined threshold, switching of the transmission mode from beamforming to e.g. TM 3 is decided. Of course, a switching back from TM 3 to beamforming mode is also possible, e.g. by tracking whether the metric decreases below a threshold which may be the same or different to the first threshold.

Considering the above described examples, when applying them in an LTE or LTE-A network which corresponds e.g. to that shown in FIG. 1, at least the following transmission mode switches (and vice versa) are possible, for example: TM3/7, TM3/8, TM 3/9.

For example, for TM 7 and TM 8, a (long term) beam weighting vector can be obtained from SRS, and for TM9, the long term beam weighting vector can be obtained from feedback PMI.

According to some further examples of embodiments, in order to track the network performance, for which the number of switches between transmission modes may be an index, counters can be implemented and provided which count, for example, at least one of the number of allowed mode switch for TM7, the number of allowed mode switch for TM8, the number of allowed mode switch for TM9, the number of disallowed mode switch for TM7, the number of disallowed mode switch for TM8, and the number of disallowed mode switch for TM9.

Furthermore, according to some examples of embodiments, the control procedure may be implemented in such a manner that the measures described above are partly or in total enabled/disabled per eNB, e.g. by O&M setting.

In the following, referring to FIG. 2, a process for controlling mode switching according to some examples of embodiments, as described above, is described, wherein reference is made to a situation as depicted e.g. in FIG. 1.

Figure 2:
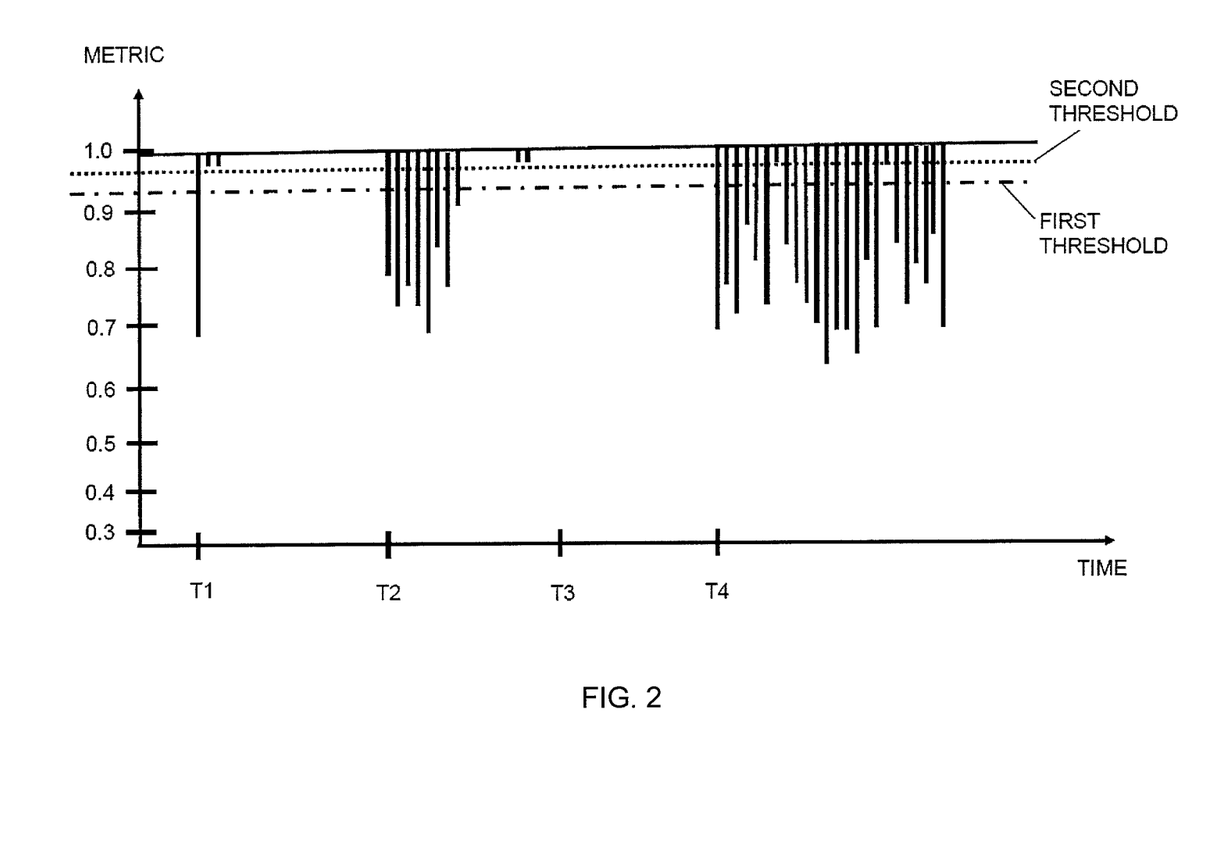
FIG. 2 shows a diagram illustrating a control procedure according to some examples of embodiments.

Specifically, FIG. 2 shows a diagram where the result of tracking a metric, such as a correlation parameter like $\rho'_n$ or the like, is tracked over a series of times. As a starting condition, it is assumed that the UE 10 is communicating with eNB 20 in a beamforming transmission mode like TM 9.

As described above, it is assumed that a proper value for a correlation between metrics, which indicates that the beamforming TM 9 is suitable (i.e. the eNB 20 can track the spatial properties of the channel fast enough), is 1 (or approximately 1). In the example indicated in FIG. 2, two thresholds are assumed to be set, i.e. a first threshold for triggering a switch from TM 9 to e.g. TM 3 of e.g. 0.95, and a second threshold for triggering a switch from TM 3 back to TM 9 of e.g. 0.99.

In the tracking period, e.g. at T1, the comparison of the metric (i.e. correlation parameter $\rho'_n$) and the first threshold (first state transition specific threshold) results in that the condition to switch from TM 9 to TM 3 is met. According to some examples of embodiments, however, since the event of being below the first threshold is valid only for a limited time (the following metrics are not below the first threshold and may be even greater than the second threshold), the switching is not actually triggered (e.g. in view of the time required for executing the mode switching in the network). Alternatively, switching may be triggered in every case the metric is below the first threshold.

Furthermore, at T2, the comparison of the metric (i.e. correlation parameter $\rho'_n$) and the first threshold (first state transition specific threshold) results again in that the condition to switch from TM 9 to TM 3 is met. Here, the events of being below the first threshold are valid for a certain time (the following metrics are also below the first threshold), so that the switching from TM 9 to TM 3 is triggered after T2. Now, according to some examples of embodiments, it is possible to trigger the switching back from TM 3 to TM 9 immediately after the metric is greater than the second threshold, or for example again after a specific number of successive events where the metric is above the second threshold, e.g. at T3.

At T4, the comparison of the metric (i.e. correlation parameter $\rho'_n$) and the first threshold (first state transition specific threshold) results again in that the condition to switch from TM 9 to TM 3 is met. Here, the events of being below the first threshold are kept valid, so that a switching from TM 9 to TM 3 is triggered after T4, and TM 3 is kept.

Figure 3:
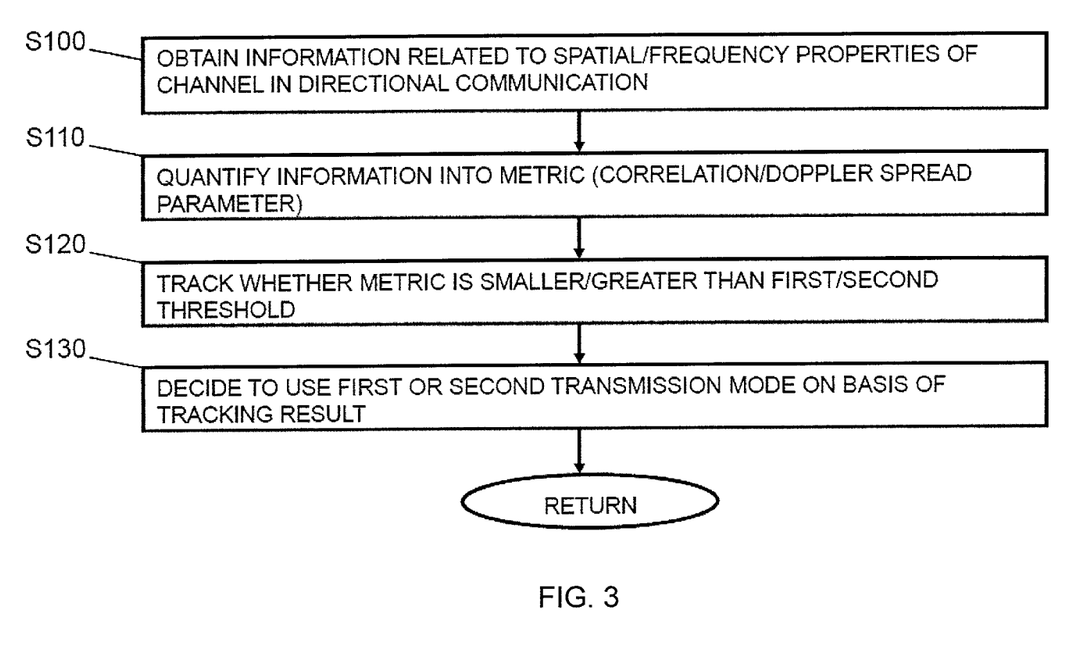
FIG. 3 shows a flow chart of a processing conducted in a communication network control element or function according to some examples of embodiments.

FIG. 3 shows a flow chart of a processing conducted in a communication network control element, such as the eNB 20, according to some examples of embodiments. Specifically, the example according to FIG. 3 is related to a control procedure conducted by the communication network control element, function or node acting as an eNB 20 in the communication network as depicted e.g. in FIG. 1.

In S100, information related to at least one of spatial properties and frequency properties of a channel used in a directional communication between a communication network control element or function, such as the eNB 20, and a communication element, such as the UE 10, is obtained over a series of times.

For example, according to some examples of embodiments, as information related to spatial properties, beamforming vectors of the directional communication are obtained, e.g. generated or received from the UE 10. Alternatively or additionally, according to some examples of embodiments, as the information related to frequency properties, frequency shift in the directional communication is obtained.

In S110, the information related to at least one of spatial properties and frequency properties are quantified into a metric. For example, according to some examples of embodiments, when beamforming vectors of the directional communication are obtained, the beamforming vectors are quantified into the metric by calculating correlation parameters over the series of times, wherein each correlation parameter indicates a correlation between successive beamforming vectors. On the other hand, according to some examples of embodiments, in case frequency shift of the directional communication is obtained, the frequency shift is quantified into a metric by calculating Doppler spread parameters over the series of times.

In S120, a tracking is conducted so as to determine whether the metric is smaller than a first threshold or greater than a second threshold during a predetermined period of time.

In S130, it is decided to use a first transmission mode or a second transmission mode on the basis of a result of the tracking in S120.

For example, according to some examples of embodiments, when tracking is conducted as to whether the metric is smaller than the first threshold or greater than the second threshold during the predetermined period of time, a rate of change in time of the metric is monitored. Then, when it is decided to use the first transmission mode or the second transmission mode on the basis of a result of the tracking, either the first transmission mode or the second transmission mode is selected on the basis of the monitoring of the rate of change in time of the metric.

For example, according to some examples of embodiments, in case the tracking results in that the metric is smaller than a first threshold, it is decided to keep the first transmission mode (when the first transmission mode is presently set) or to switch from the second transmission mode to the first transmission mode (when the second transmission mode is presently set). On the other hand, in case the tracking results in that the metric is greater than a second threshold, it is decided to keep the second transmission mode (when the second transmission mode is presently set) or to switch from the first second transmission mode to the second transmission mode (when the first transmission mode is presently set).

According to some examples of embodiments, the first threshold is equal to the second threshold (i.e. only one threshold is considered). Alternatively, the first threshold is smaller than the second threshold.

Furthermore, according to some examples of embodiments, the first transmission mode is a transmission mode comprising a MIMO communication using a sector beam for communication (i.e. sector 200-1 in FIG. 1). On the other hand, the second transmission mode is a transmission mode comprising a user specific beamforming (i.e. beam 200-2 in FIG. 1). Specifically, according to some examples of embodiments the first transmission mode comprises TM3 of a LTE or LTE-A communication network, and the second transmission mode comprises at least one of a TM7, TM8 and TM9 of a LTE or LTE-A communication network.

According to some examples of embodiments, in parallel to the above defined control for switching based on spatial or frequency properties, also a measuring of an SINR on the channel used in the directional communication between the eNB 20 and the UE 10 is conducted. A result of the measurement of the SINR is then considered in S130, i.e. when deciding to use the first transmission mode or the second transmission mode.

Moreover, according to some examples of embodiments, a forgetting filter may be applied to the metric for controlling a number of metric updates to be considered in the tracking of S120 and the deciding in S130.

In addition, according to some examples of embodiments, it is determined whether a handover (HO) processing is conducted for the UE 10 of the directional communication. In case such a HO processing is conducted, the decision to use the first transmission mode or the second transmission mode, i.e. a decision to switch between the first and second transmission modes is suspended at least until the handover processing is terminated.

Figure 4:
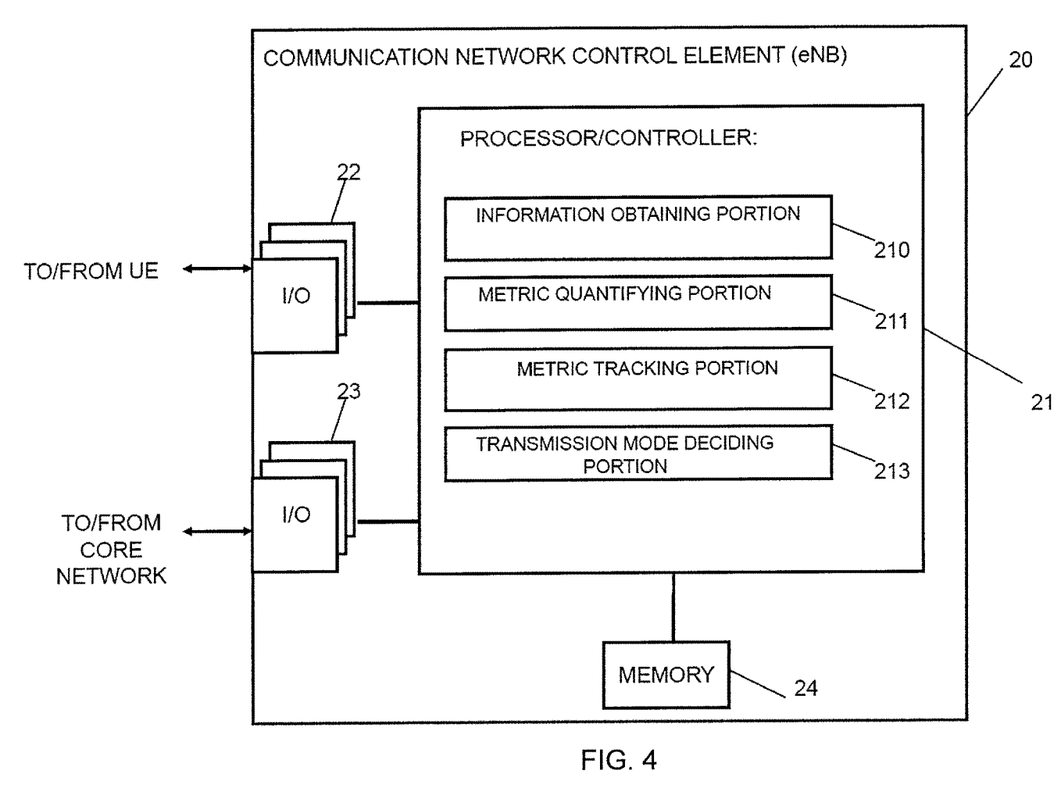
FIG. 4 shows a diagram of a network element acting as a communication network control element or function according to some examples of embodiments.

FIG. 4 shows a diagram of a communication network control element according to some examples of embodiments, which is configured to implement a control procedure as described in connection with some of the examples of embodiments. It is to be noted that the communication network control element, like the eNB 20, which is shown in FIG. 4, may include further elements or functions besides those described herein below. Furthermore, even though reference is made to a communication network control element or node, the element or node may be also another device or function having a similar task, such as a chipset, a chip, a module, an application etc., which can also be part of a communication network control element or attached as a separate element to a communication network control element, or the like. It should be understood that each block and any combination thereof may be implemented by various means or their combinations, such as hardware, software, firmware, one or more processors and/or circuitry.

The communication network control element shown in FIG. 4 may include a processing circuitry, a processing function, a control unit or a processor 21, such as a CPU or the like, which is suitable for executing instructions given by programs or the like related to the control procedure. The processor 21 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference signs 22 and 23 denote transceiver or input/output (I/O) units or functions (interfaces) connected to the processor or processing function 21. The I/O units 22 may be used for communicating with a communication element, such as the UE 10, wherein different transmission modes may be applied. The I/O units 23 may be used for communicating with a core network. The I/O units 22 and 23 may be a combined unit including communication equipment towards several network elements, or may include a distributed structure with a plurality of different interfaces for different network elements. Reference sign 24 denotes a memory usable, for example, for storing data and programs to be executed by the processor or processing function 21 and/or as a working storage of the processor or processing function 21. It is to be noted that the memory 24 may be implemented by using one or more memory portions of the same or different type of memory.

The processor or processing function 21 is configured to execute processing related to the above described control procedure. In particular, the processor or processing circuitry or function 21 includes one or more of the following sub-portions. Sub-portion 210 is a processing portion which is usable for obtaining information related to spatial or frequency properties. The portion 210 may be configured to perform processing according to S100 of FIG. 3. Furthermore, the processor or processing circuitry or function 21 may include a sub-portion 211 usable as a portion for quantifying a metric. The portion 211 may be configured to perform a processing according to S210 of FIG. 3. In addition, the processor or processing circuitry or function 21 may include a sub-portion 212 usable as a portion for conducting a tracking of the metric. The portion 212 may be configured to perform a processing according to S120 of FIG. 3. Furthermore, the processor or processing circuitry or function 21 may include a sub-portion 213 usable as a portion for deciding which transmission mode is used. The portion 213 may be configured to perform a processing according to S130 of FIG. 3

By means of the measures described above, it is possible to improve a control for switching between transmission modes so as to improve network performance by properly adapt the UEs transmission mode. In particular, the switch between transmission modes using e.g BF and MIMO can be optimized for a specific fast moving UE. That is, a faster switching away from BF for those users for whom BF is not suitable (e.g. moving too quickly) is possible, which results in better user experience due to a more stable throughput for that user. Hence, the system performance can be improved for certain scenarios, e.g. a high speed used scenario.

Moreover, additional scenarios where switch to TM3 should be executed can be identified. Furthermore, beamforming performance is made more robust, since UE's spatial condition variation speed is considered in the switching decision.

In addition, the proposed solution can work independently with existing algorithms and network element configurations.

It is to be noted that some or all of the examples of embodiments described above may be applied to a partly or fully virtualized environment comprising one or more VNFs.

According to another example of embodiments, there is provided an apparatus comprising means for obtaining, over a series of times, information related to at least one of spatial properties and frequency properties of a channel used in a directional communication between a communication network control element or function and a communication element, means for quantifying the information related to at least one of spatial properties and frequency properties into a metric, means for tracking whether the metric is smaller than a first threshold or greater than a second threshold during a predetermined period of time, and means for deciding to use a first transmission mode or a second transmission mode on the basis of a result of the tracking.

Furthermore, according to some other examples of embodiments, the above defined apparatus may further comprise means for conducting at least one of the processings defined in the above described methods, for example a method according that described in connection with FIG. 3.

It should be appreciated that an access technology via which signaling is transferred to and from a network element may be any suitable present or future technology, such as WLAN (Wireless Local Access Network), WiMAX (Worldwide Interoperability for Microwave Access), LTE, LTE-A, Bluetooth, Infrared, and the like may be used; additionally, embodiments may also apply wired technologies, e.g. IP based access technologies like cable networks or fixed lines.

a user device (also called UE, user equipment, user terminal, terminal device, etc.) illustrates one type of an apparatus to which resources on the air interface may be allocated and assigned, and thus any feature described herein with a user equipment may be implemented with a corresponding apparatus, such as a relay node. An example of such a relay node is a layer 3 relay (self-backhauling relay) towards a base station or eNB. The user device typically refers to a portable computing device that includes wireless mobile communication devices operating with or without a subscriber identification module (SIM), including, but not limited to, the following types of devices: a mobile station (mobile phone), smart phone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network, or a nearly exclusive downlink only device, such as a portable video player. Also equipment used for measuring certain values, such as sensors which can measure a temperature, a pressure etc., can be used as a corresponding user device. It should be appreciated that a device may be regarded as an apparatus or as an assembly of more than one apparatus, whether functionally in cooperation with each other or functionally independently of each other but in a same device housing.

embodiments suitable to be implemented as software code or portions of it and being run using a processor or processing function are software code independent and can be specified using any known or future developed programming language, such as a high-level programming language, such as objective-C, C, C++, C#, Java, etc., or a low-level programming language, such as a machine language, or an assembler.

implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units, means or functions, or in a distributed fashion, for example, one or more processors or processing functions may be used or shared in the processing, or one or more processing sections or processing portions may be used and shared in the processing, wherein one physical processor or more than one physical processor may be used for implementing one or more processing portions dedicated to specific processing as described, an apparatus may be implemented by a semiconductor chip, a chipset, or a (hardware) module including such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, including a computer usable medium having a computer readable program code embodied therein, the computer readable program code adapted to execute a process as described in embodiments, wherein the computer usable medium may be a non-transitory medium.

Although the present invention has been described herein before with reference to particular embodiments thereof, the present invention is not limited thereto and various modifications can be made thereto.

The invention claimed is:

1. An apparatus comprising:
   at least one processing circuitry, and
   at least one non-transitory memory for storing instructions to be executed by the processing circuitry, wherein the at least one memory and the instructions are configured to, with the at least one processing circuitry, cause the apparatus at least to:
   obtain, over a series of times, information related to at least one of spatial properties and frequency properties of a channel used in a directional communication between a communication network control element or function and a communication element;
   quantify the information related to the at least one of the spatial properties and the frequency properties into a metric;
   track whether the metric is smaller than a first threshold or greater than a second threshold during a predetermined period of time and monitor a rate of change in time of the metric; and
   decide to use a first transmission mode or a second transmission mode based on a result of the tracking and select either the first transmission mode or the second transmission mode based on the monitoring of the rate of change in time of the metric.

2. The apparatus according to claim 1,
   wherein the obtained information comprises beamforming vectors, and
   wherein the quantifying comprises quantifying the beamforming vectors into the metric,
   wherein the quantifying of the beamforming vectors into the metric comprises calculating correlation parameters over the series of times, wherein each correlation parameter indicates a correlation between successive beamforming vectors.

3. The apparatus according to claim 1,
   wherein the obtained information comprises frequency shifts and
   wherein the quantifying comprises quantifying the frequency shifts into the metric, wherein the quantifying of the frequency shifts into the metric comprises calculating Doppler spread parameters over the series of times.

4. The apparatus according to claim 1, wherein the at least one memory and the instructions are further configured to, with the at least one processing circuitry, further cause the apparatus at least to:
   in case the result of the tracking is that the metric is smaller than the first threshold, decide to keep the first transmission mode or to switch from the second transmission mode to the first transmission mode, and
   in case the result of the tracking is that the metric is greater than the second threshold, decide to keep the second transmission mode or to switch from the first transmission mode to the second transmission mode.

5. The apparatus according to claim 1, wherein the first threshold is equal to the second threshold, or the first threshold is smaller than the second threshold.

6. The apparatus according to claim 1, wherein the first transmission mode is a transmission mode comprising a multiple-input-multiple-output communication using a sector beam for communication, and the second transmission mode is a transmission mode comprising a user specific beamforming.

7. The apparatus according to claim 6, wherein the first transmission mode comprises a transmission mode 3 of a Long-Term-Evolution or Long-Term-Evolution-Advanced communication network, and the second transmission mode comprises at least one of a transmission mode 7, transmission mode 8 and transmission mode 9 of a Long-Term-Evolution or Long-Term-Evolution-Advanced communication network.

8. The apparatus according to claim 1, wherein the at least one memory and the instructions are further configured to, with the at least one processing circuitry, further cause the apparatus at least to:
   measure a signal-to-interference-and-noise ratio on the channel used in the directional communication between the communication network control element or function and the communication element, and
   decide to use the first transmission mode or the second transmission mode based at least in part on the measured signal-to-interference-and-noise ratio.

9. The apparatus according to claim 1, wherein the at least one memory and the instructions are further configured to, with the at least one processing circuitry, further cause the apparatus at least to:
   apply a forgetting filter to the metric for controlling a number of metric updates to be considered in the tracking and deciding.

10. The apparatus according to claim 1, wherein the at least one memory and the instructions are further configured to, with the at least one processing circuitry, further cause the apparatus at least to:
    determine whether a handover processing is conducted for the communication element of the directional communication, and
    suspend the deciding to use the first transmission mode or the second transmission mode in case a handover processing is conducted.

11. The apparatus according to claim 1, wherein the apparatus is included in the communication network control element configured to control the directional communication to the communication network control element, wherein the communication network control element includes at least one of a terminal device or user equipment.

12. The apparatus of claim 1, wherein the information corresponds to at least one of: beamforming vectors of the directional communication and frequency shifts of the directional communication.

13. A method comprising:
    obtaining, over a series of times, information related to at least one of spatial properties and frequency properties of a channel used in a directional communication between a communication network control element or function and a communication element,
    quantifying the information related to the at least one of the spatial properties and the frequency properties into a metric,
    tracking whether the metric is smaller than a first threshold or greater than a second threshold during a predetermined period of time and monitoring a rate of change in time of the metric, and
    deciding to use a first transmission mode or a second transmission mode based on a result of the tracking and selecting either the first transmission mode or the second transmission mode based on the monitoring of the rate of change in time of the metric.

14. The method according to claim 13, wherein at least one of:
    wherein the obtained information comprises beamforming vectors, and wherein the quantifying comprises quantifying the beamforming vectors into the metric, wherein the quantifying of the beamforming vectors into the metric comprises calculating correlation parameters over the series of times, wherein each correlation parameter indicates a correlation between successive beamforming vectors; and wherein the obtained information comprises frequency shifts and wherein the quantifying comprises quantifying the frequency shifts into the metric, wherein the quantifying of the frequency shifts into the metric comprises calculating Doppler spread parameters over the series of times.

15. The method according to claim 13, further comprising:

deciding, in case the result of the tracking is that the metric is smaller than the first threshold, to keep the first transmission mode or to switch from the second transmission mode to the first transmission mode, and deciding, in case the result of the tracking is that the metric is greater than a second threshold, to keep the second transmission mode or to switch from the first transmission mode to the second transmission mode.

16. The method according to claim 13, wherein the first threshold is equal to the second threshold, or the first threshold is smaller than the second threshold.

17. The method according to claim 13, wherein the first transmission mode is a transmission mode comprising a multiple-input-multiple-output communication using a sector beam for communication, and the second transmission mode is a transmission mode comprising a user specific beamforming.

18. The method according to claim 13, further comprising:

measuring a signal-to-interference-and-noise ratio on the channel used in the directional communication between the communication network control element or function and the communication element, and deciding to use the first transmission mode or the second transmission mode based at least in part on the measured signal-to-interference-and-noise ratio.

19. The method according to claim 13, further comprising:

applying a forgetting filter to the metric for controlling a number of metric updates to be considered in the tracking and deciding.

20. The method according to claim 13, further comprising:

determining whether a handover processing is conducted for the communication element of the directional communication, and suspending the deciding to use the first transmission mode or the second transmission mode in case a handover processing is conducted.

21. The method of claim 13, wherein the information corresponds to at least one of: beamforming vectors of the directional communication and frequency shifts of the directional communication.

22. A computer program product comprising a non-transitory computer usable medium having a computer readable program code embodied therein, the computer readable program code adapted to execute a process comprising:

obtaining, over a series of times, information related to at least one of spatial properties and frequency properties of a channel used in a directional communication between a communication network control element or function and a communication element, quantifying the information related to the at least one of the spatial properties and the frequency properties into a metric, tracking whether the metric is smaller than a first threshold or greater than a second threshold during a predetermined period of time and monitoring a rate of change in time of the metric, and deciding to use a first transmission mode or a second transmission mode based on a result of the tracking and selecting either the first transmission mode or the second transmission mode based on the monitoring of the rate of change in time of the metric.

* * * * *